United States Patent
Chow et al.

(10) Patent No.: US 7,141,629 B2
(45) Date of Patent: Nov. 28, 2006

(54) EPOXY RESIN COMPOSITION

(75) Inventors: Sim Chow, Cambridge (GB); Dean Anthony Bugg, Cambridge (GB)

(73) Assignee: Huntsman Advanced Materials Americas Inc., The Woodlands, TX (US)

( * ) Notice: Subject to any disclaimer, the term of this patent is extended or adjusted under 35 U.S.C. 154(b) by 0 days.

(21) Appl. No.: 10/182,412

(22) PCT Filed: Jan. 23, 2001

(86) PCT No.: PCT/EP01/00697

§ 371 (c)(1),
(2), (4) Date: Jan. 21, 2003

(87) PCT Pub. No.: WO01/57110

PCT Pub. Date: Aug. 9, 2001

(65) Prior Publication Data

US 2003/0149194 A1 Aug. 7, 2003

(30) Foreign Application Priority Data

Jan. 31, 2000 (EP) .................................. 00810087

(51) Int. Cl.
*C08G 59/02* (2006.01)

(52) U.S. Cl. ..................... 525/523; 528/65; 528/73; 528/85; 528/418

(58) Field of Classification Search ................ 525/523; 528/65, 73, 85, 418
See application file for complete search history.

(56) References Cited

U.S. PATENT DOCUMENTS

| 4,036,906 | A | * | 7/1977 | Finelli ........................ 528/61 |
| 4,067,843 | A | | 1/1978 | Annis et al. |
| 4,483,974 | A | | 11/1984 | Grogler et al. |
| 4,486,557 | A | * | 12/1984 | Gaul et al. ................... 523/446 |
| 4,663,415 | A | | 5/1987 | Grogler et al. |
| 4,667,008 | A | | 5/1987 | Grogler et al. |
| 5,200,494 | A | * | 4/1993 | Kubota et al. ............... 528/111 |
| 5,227,414 | A | * | 7/1993 | Ernst et al. ................... 523/417 |
| 5,266,662 | A | | 11/1993 | Jakob et al. |
| 5,275,853 | A | | 1/1994 | Silvis et al. |
| 5,449,737 | A | * | 9/1995 | Uchida et al. ................. 528/73 |
| 5,633,341 | A | | 5/1997 | Abend |
| 5,708,120 | A | | 1/1998 | White |
| 5,844,047 | A | | 12/1998 | Abend |
| 5,977,286 | A | * | 11/1999 | Marten et al. ............... 528/120 |
| 6,051,632 | A | | 4/2000 | Schrader et al. |
| 6,348,548 | B1 | | 2/2002 | Abend |

FOREIGN PATENT DOCUMENTS

| EP | 0 531 844 | 8/1992 |
| EP | 0 639 618 | 8/1994 |
| EP | 0 922 720 | 12/1997 |
| JP | 62138520 | 6/1987 |
| WO | WO 97/19124 | 5/1997 |
| WO | WO 97/19125 | 5/1997 |

OTHER PUBLICATIONS

Encyclopedia of Polymer Science and Technology, 2002, excerpt from the article on Ligin.*

* cited by examiner

*Primary Examiner*—Margaret G. Moore
(74) *Attorney, Agent, or Firm*—Ron D. Brown; Robert Holthus

(57) ABSTRACT

A composition comprising (A) an epoxide containing at least two epoxy groups per molecule, (B) a polyol containing at least two hydroxy groups per molecule or a primary or secondary amine containing at least two amino-hydrogen atoms per molecule, and (C) a solid compound containing at least two isocyanate groups, exhibits high storage stability and is useful as protective coating or adhesive.

7 Claims, No Drawings

EPOXY RESIN COMPOSITION

This invention relates to an epoxy resin composition containing two curing agents having different reactivities, a method for the manufacture of a one-component thermosetting resin composition, the use of said one-component thermosetting resin composition as protective coating or adhesive and the crosslinked products obtainable by curing said one-component thermosetting resin composition.

Industry continues to seek new materials which can be prepared in a simple manner, which are shelf stable, uncomplicated in use and provide ever increasing greater variety of readily tailorable properties.

Because of their versatility and variety, epoxy based systems are important basic resins for adhesives and composites and are most useful in many areas of applications (aero, automotive, industrial, consumer etc.).

The principal reaction undergone by epoxy systems is of the addition type (catalysed or not) with amines, acids, anhydrides etc. The formulation can be of the single component type (involving stabilised mixtures of the epoxy resin and the hardener) or double component type (in which the reactant is mixed with the epoxy resin just prior to use). The single component type is simpler to use with less packaging waste; however, great care needs to be taken to ensure that pre-mature reaction does not occur resulting in poor shelf life before use. Conventional hot melt and heat curable powder epoxy resin compositions, which can be prepared from an epoxy resin and a hardener composition containing an amine solidifying system and a latent hardener, are disclosed in U.S. Pat. No. 5,708,120, WO 97/19124 and WO 97/19125.

Isocyanates are also of considerable interest due to their ability to undergo rapid nucleophilic addition reactions with hydroxy groups, amino groups and other active hydrogen containing groups, thus producing urethane and urea products. In order to use isocyanates in single component systems it is well known, for instance from U.S. Pat. No. 4,483,974, to produce stabilised/deactivated isocyanate dispersions or powders having a shell of urea or urethane. U.S. Pat. No. 4,067,843 describes the preparation of granular phenolicurethane compounds from an already co-polymerised mixture of polyisocyanates and hydroxy-terminated polydienes. These granules are useful as thermoset adhesives.

Conventional epoxy systems containing amines or anhydrides as latent curatives have the disadvantage that the final cure is carried out at relatively high temperatures (180–220° C.).

It has now been found that mixtures of epoxy resins, polyamines or polyols and solid isocyanates form highly tailorable, shelf stable one-component compositions which gel or solidify at ambient temperature and can be completely cured at the temperature range of 60 to 180° C.

Accordingly, the present invention relates to a composition comprising (A) an epoxide containing at least two epoxy groups per molecule,
(B) a polyol containing at least two hydroxy groups per molecule or a primary or secondary amine containing at least two amino-hydrogen atoms per molecule, and
(C) a solid compound containing at least two isocyanate groups.

Suitable as component (A) for the preparation of the compositions according to the invention are the epoxy resins customarily employed in epoxy resin technology. Examples of epoxy resins are:

I) Polyglycidyl and poly(β-methylglycidyl) esters, obtainable by reaction of a compound having at least two carboxy groups in the molecule with epichlorohydrin or β-methylepichlorohydrin, respectively. The reaction is advantageously carried out in the presence to bases.

As compounds having at least two carboxy groups in the molecule there may be used aliphatic polycarboxylic acids. Examples of such polycarboxylic acids are oxalic acid, succinic acid, glutaric acid, adipic acid, pimelic acid, suberic acid, azelaic acid and dimerised or trimerised linoleic acid.

It is also possible, however, to use cycloaliphatic polycarboxylic acids, for example tetrahydrophthalic acid, 4-methyltetrahydrophthalic acid, hexahydrophthalic acid and 4-methyl-hexahydrophthalic acid.

Aromatic polycarboxylic acids may also be used, for example phthalic acid, isophthalic acid and terephthalic acid.

II) Polyglycidyl or poly(β-methylglycidyl) ethers, obtainable by reaction of a compound having at least two free alcoholic hydroxy groups and/or phenolic hydroxy groups with epichlorohydrin or β-methylepichlorohydrin, respectively, under alkaline conditions or in the presence of an acid catalyst with subsequent alkaline treatment.

Such glycidyl ethers are derived, for example, from acyclic alcohols, e.g. from ethylene glycol, diethylene glycol or higher poly(oxyethylene) glycols, propane-1,2-diol or poly-(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol, and also from polyepichlorohydrins.

Further such glycidyl ethers are derived from cycloaliphatic alcohols, such as 1,4-cyclo-hexanedimethanol, bis(4-hydroxycyclohexyl)methane or 2,2-bis(4-hydroxycyclohexyl)-propane, or from alcohols containing aromatic groups and/or further functional groups, such as N,N-bis(2-hydroxyethyl)aniline or p,p'-bis(2-hydroxyethylamino)diphenylmethane.

The glycidyl ethers may be based on mononuclear phenols, for example resorcinol or hydroquinone, or on polynuclear phenols, for example bis(4-hydroxyphenyl)methane, 4,4-dihydroxybiphenyl, bis(4-hydroxyphenyl)sulfone, 1,1,2,2-tetrakis(4-hydroxyphenyl)ethane, 2,2-bis(4-hydroxyphenyl)propane or 2,2-bis(3,5-dibromo-4-hydroxyphenyl) propane.

Further suitable hydroxy compounds for the preparation of glycidyl ethers are novolaks, obtainable by condensation of aldehydes, such as formaldehyde, acetaldehyde, chloral or furfuraldehyde, with phenols or bisphenols unsubstituted or substituted by chlorine atoms or by $C_1$–$C_9$alkyl groups, for example phenol, 4-chlorophenol, 2-methylphenol or 4-tert-butyl-phenol.

III) Poly(N-glycidyl) compounds, obtainable by dehydrochlorination of the reaction products of epichlorohydrin with amines that contain at least two amine hydrogen atoms. Those amines are, for example, aniline, n-butylamine, bis (4-aminophenyl)methane, m-xylene-diamine or bis(4-methylaminophenyl)methane.

The poly(N-glycidyl) compounds, however, include also triglycidyl isocyanurate, N,N'-di-glycidyl derivatives of cycloalkyleneureas, such as ethyleneurea or 1,3-propyleneurea, and diglycidyl derivatives of hydantoins, such as of 5,5-dimethylhydantoin.

IV) Poly(S-glycidyl) compounds, for example di-S-glycidyl derivatives, derived from dithiols. for example ethane-1,2-dithiol or bis(4-mercaptomethylphenyl) ether.

V) Cycloaliphatic epoxy resins, for example bis(2,3-epoxycyclopentyl) ether, 2,3-epoxycyclopentylglycidyl ether, 1,2-bis(2,3-epoxycyclopentyloxy)ethane or 3,4-epoxycyclohexylmethyl-3',4'-epoxycyclohexanecarboxylate.

Alternatively, epoxy resins may be used in which the 1,2-epoxide groups are bonded to different hetero atoms and/or functional groups; those compounds include, for example, the N,N,O-triglycidyl derivative of 4-aminophenol, the glycidyl ether-glycidyl ester of salicylic acid, N-glycidyl-N'-(2-glycidyloxypropyl)-5,5-dimethylhydantoin and 2-glycidyloxy-1,3-bis-(5.5-dimethyl-1-glycidylhydantoin-3-yl)propane.

For the preparation of the compositions according to the invention, it is preferred to use a diglycidyl ether or ester Especially preferred as component (A) are a diglycidyl ether of bisphenol A and a diglycidyl ether of bisphenol F.

Component (B) of the mixtures according to the invention can, as mentioned, be any polyol having at least two hydroxy groups or any amine having at least two amino-hydrogen atoms.

Suitable polyols are aliphatic and aromatic polyols.

Examples of suitable aliphatic polyols are ethylene glycol, diethylene glycol, polyethylene glycol, propylene glycol, polypropylene glycol, propane-1,3-diol, butane-1,4-diol, pentane-1,5-diol, hexane-1,6-diol, hexane-1,2,3-triol, glycerine, 1,1,1-trimethylolpropane, pentaerythritol and sorbitol.

Suitable aromatic polyols are, for example, resorcinol, hydroquinone, N,N-bis-(2-hydroxyethyl)aniline, p,p-bis-(2-hydroxyethylamino)-diphenylmethane, bis-(4-hydroxyphenyl)-methane, 4,4'-dihydroxybiphenyl, bis-(4-hydroxyphenyl)-sulfone, 1,1,2,2-tetrakis-(4-hydroxyphenyl)-ethane, 2,2-bis-(4-hydroxyphenyl)-propane, 2,2-bis-(3,5-dibromo-4-hydroxyphenyl)-propane, phenol novolaks and cresol novolaks.

Amines as component (B) may be aliphatic, cycloaliphatic, aromatic and heterocyclic amines, such as bis-(4-aminophenyl)-methane, aniline/formaldehyde resins, benzylamine. n-octylamine, propane-1,3-diamine, 2,2-dimethyl-1,3-propanediamine, hexamethylenediamine diethylenetriamine, bis-(3-aminopropyl)-amine, N,N-bis-(3-aminopropyl)-methylamine, triethylenetetramine, tetraethylenepentamine, pentaethylenehexamine, 2,2,4-trimethylhexane-1,6-diamine, m-xylenediamine, 1,2- and 1,4-diaminocyclohexane, bis-(4-aminocyclohexyl)-methane, bis-(4-amino-3-methyl-cyclohexyl)-methane, 2,2-bis-(4-aminocyclohexyl)-propane, piperazine, 3-aminomethyl-3,5,5-trimethylcyclohexylamine (isophoronediamine), polyaminoimidazolines, polyaminoamides, polyoxyalkyleneamines (e.g. Jeffamines® made by Texaco), 1,1 4-diamino-4,11-dioxatetradecane, dipropylenetriamine 2-methyl-1,5-pentanediamine, N,N'-dicyclohexyl-1,6-hexanediam ine, N,N'-dimethyl-1,3-diaminopropane, N,N'-diethyl-1,3-diaminopropane, N,N-dimethyl-1,3-diaminopropane, secondary polyoxypropylene-diamines and -triamines, 2,5-diamino-2,5-dimethylhexane. bis-(aminomethyl)-tricyclopentadiene, m-aminobenzylamine, 1,8-diamino-p-menthane, bis-(4-amino-3,5-dimethylcyclohexyl)-methane, 1,3-bis-(aminomethyl)-cyclohexane, dipentylamine. bis-(4-amino-3,5-diethylphenyl)-methane, 3,5-diethyltoluene-2,4-diamine and 3,5-diethyltoluene-2,6-diamine.

The polyetheramines disclosed in U.S. Pat. No. 5,275,853 are also suitable as component (B) in the compositions according to the invention.

Preferably, component B is an aliphatic or cycloaliphatic amine.

Cyclohexylamine, 4,4'-diaminodicyclohexylmethane, 4,4'-diamino-3,3'-dimethyidicyclohexyl-methane, 2,2-bis(4-aminocyclohexyl)propane are 2,2-bis(4-amino-3-methylcyclohexyl)propane are particularly preferred.

Component C is an isocyanate group containing compound or a mixture of isocyanate group containing compounds which is solid at room temperature. Preferably component C is applied in the form of a powder.

Polyisocyanates useful as component (C) in the compositions according to the invention include low-viscosity aliphatic, cycloaliphatic or aromatic isocyanates and mixtures thereof Preferably, component C is a diisocyanate monomer, a diisocyanate dimer, a diisocyanate trimer or a solid reaction product of a diisocyanate and an aliphatic diol.

Examples for suitable polyisocyanates are 2,4-diphenylmethane diisocyanate, 4,4-diphenylmethane diisocyanate, hexane-1,6-diisocyanate, cyclohexane-1,2-diisocyanate. cyclohexane-1,3-diisocyanate, cyclohexane-1,4-diisocyanate, 4,4'-dicyclohexylmethane diisocyanate, isophorone diisocyanate, phenylenediisocyanate, xylene diisocyanate, toluene-2,4-diisocyanate, toluene-2,6-diisocyanate, naphthalene-1,4-diisocyanate, 4,4'-diphenylether diisocyanate, 4,4'-diphenylsulfone diisocyanate, 2,2-bis(4-isocyanatophenyl)propane and 3,3',4,4'-diphenylmethane tetraisocyanate.

Polyol-modified polyisocyanates and mixtures of liquid polyisocyanates with higher molecular polyisocyanates or carbodiimide polyisocyanates can also be applied. Further suitable polyisocyanates are dimers and trimers of the above-mentioned multivalent isocyanates; such polyisocyanates have end-position free isocyanate groups and contain one or more uretdione and/or isocyanurate rings.

Particularly preferred polyisocyanates are 2,4-toluene diisocyanate, 2,6-toluene diisocyanate, 2,3-toluene diisocyanate, 3,4-toluene diisocyanate, 4,4'-diphenylmethane diisocyanate, 2,2'-diphenylmethane diisocyanate, p-phenylene diisocyanate, isophorone diisocyanate and 4,4'-methylene-bis(cyclohexylisocyanate).

In the curative compositions according to the invention the relative amounts of components (A), (B) and (C) can vary within wide ranges.

Purposively, component (B) is applied in such an amount that per epoxy group of component (A) from 0.05 to 0.60, preferably from 0.1 to 0.4, hydroxy groups or amine hydrogen atoms, respectively, are present.

The crosslinking density of the cured product can be adjusted by the amount of component (C). Preferably, the composition according to the invention contains component (C) in such an amount that per epoxy group of component (A) from 0.05 to 1.00. preferably from 0.1 to 0.5, isocyanate groups are present.

The compositions according to the invention may, where appropriate, comprise further accelerators, such as imidazoles or benzyldimethylamine.

Moreover, the curable mixtures may comprise fillers, such as metal powder, wood dust, glass powder, glass beads, semimetal oxides and metal oxides, for example $SiO_2$ (aerosils. quartz, quartz powder, fused silica powder), corundum and titanium oxide, semimetal nitrides and metal nitrides, such as silicon nitride, boron nitride and aluminium nitride, semimetal carbides and metal carbides (SiC), metal carbonates (dolomite, Amine 21k, $CaCO_3$), metal sulfates.(barite, gypsum), mineral fillers and natural or synthetic minerals mainly from the silicates series, such as zeolites (especially molecular sieves) talcum, mica, kaolin, wollastonite, bentonite and others.

In addition to the above-mentioned additives, the curable mixtures may comprise further customary adjuvants, for example antioxidants, light stabilizers, plasticizers, colorants, pigments, thixotropic agents, toughness improvers, antifoams, antistatics, glidants and demoulding auxiliaries.

The compositions according to the invention may be prepared by hand mixing or by using known mixing apparatus, for example stirrers, kneaders or rollers. In the case of solid epoxy resins, dispersing may be carried out also in the melt. The temperature during the dispersing is to be so selected that premature curing does not occur during the mixing process. The optimum curing conditions are dependent on the microgel, on the type and amount of the nitrogen-containing base, on the epoxy resin and on the form of dispersing, and can be determined by the person skilled in the art in each case using known methods.

Due to the use of two hardeners of different reactivity, the compositions according to the invention can be cured in a two-step process. After mixing, the epoxy resin (A) reacts at room temperature or at slightly elevated temperature with the polyol or polyamine (B); the increase of viscosity thereby specifies the extent of this so-called B-stage curing.

The products obtained by the room temperature curing step generally show good tack and exhibit excellent storage stability.

In the second curing step which requires higher temperatures (60–180° C.) the secondary hydroxy groups formed during the first curing step react with the isocyanate groups of component (C). The crosslinked products obtained by this C-stage curing distinguish by an excellent lap shear strength.

The invention further relates to a method for the manufacture of a one-component thermosetting resin composition in gel, paste or powder form which comprises mixing components (A), (B) and (C) according to claim 1 and reacting the mixture at temperatures <50° C. until the viscosity of the mixture is at least 10% higher than the initial viscosity.

The storage stable one-component resin compositions obtained by the B-stage curing are particularly useful as protective coatings or adhesives.

The invention further relates to the crosslinked products obtainable by curing the one-component thermosetting resin composition at 60–180° C.

In the examples, which are illustrative of the present invention and are therefore not intended as a limitation on the scope thereof, the following. ingredients are used:

Epoxy resin 1: liquid bisphenol A diglycidylether having an average epoxide equivalent of 5.395 equivalents/kg Epoxy resin 2: liquid bisphenol F diglycidylether having an average epoxide equivalent of 5.95 equivalents/kg Amine 1: 4,4'-diamino-3,3'-dimethyl dicyclohexyl methane Amine 2: cyclohexylamine Amine 3: 4,7,10-trioxa-1, 13-tridecanediamine (trade name Q19262)

Isocyanate 1: toluenediisocyanate uretidone dimer (trade name Desmodur TT, NCO content ~24% by weight)

Isocyanate 2: isophorone diisocyanate trimer (trade name Vestanate, NCO content ~17° by weight)

EXAMPLE 1

Comparison 100 g Epoxy resin 1 is blended with 6 g amine 1. The mixture is thoroughly hand-mixed and after 24 hours the mixture is a clear viscous liquid showing good tack and appears to be stable with time.

EXAMPLE 2

100 g epoxy resin 1 is hand-mixed with 6 g amine 1. Subsequently, 17.5 g isocyanate 1 powder is added and the mixture is passed through the triple roll mill for two cycles. On standing for 24 hours, a white viscous liquid is obtained showing good tack and high storage stability.

EXAMPLE 3

A mixture of 100 g epoxy resin 1,6 g amine 1 and 14 g isocyanate 1 powder is processed as described in Example 2. The product is a viscous liquid showing good tack and high storage stability.

EXAMPLE 4

A mixture of 100 g epoxy resin 1,6 g amine 1 and 10.5 g isocyanate 1 powder is processed as described in Example 2. The product is a viscous liquid showing good tack and high storage stability.

EXAMPLE 5

Comparison

A blend of 100 g epoxy resin 1 and 8 g amine 1 is mixed thoroughly and allowed to stand for 24 hours. The resulting product is a highly viscous clear liquid which exhibits little tack.

EXAMPLE 6

A blend of 100 g epoxy resin 1, 8 g amine 1 and 23.4 g isocyanate 1 powder is hand-mixed and passed through the triple roll mill for two cycles. The resulting product is a white, highly viscous liquid exhibiting no tack.

From the gelled products obtained in Examples 1–6, lap shear samples are made by curing at 120° C. for 30 min using aluminium plates (L165) in triplicate. The results are summarised in Table 1.

TABLE 1

| Example | Lap Shear Strength [N/mm$^2$] |
|---|---|
| 1 | 0.02 |
| 2 | 12.07 |
| 3 | 10.97 |
| 4 | 10.48 |
| 5 | 0.64 |
| 6 | 16.55 |

The data show that the samples containing the latent isocyanate crosslinker exhibit significant higher lap shear strength than comparative examples 1 and 5.

EXAMPLES 7–14

Blends of epoxy resin 1, amine 1 and isocyanate 2 are prepared and processed as described in Example 2. The isocyanate 2 is supplied in pellet form and is put through a coffee grinder (white powder, irregular in shape, average particle diameter approximately 100 μm). The resulting products are milky viscous pastes.

From the gelled products obtained in Examples 7–14, lap shear samples are made by curing at 60° C. and 80° C., respectively, for 16 h using aluminium plates (L165) in triplicate. The results are summarised in Table 2.

TABLE 2

| Example | 7 | 8 | 9 | 10 | 11 | 12 | 13 | 14 |
|---|---|---|---|---|---|---|---|---|
| epoxy resin 1 [g] | 100 | 100 | 100 | 100 | 100 | 100 | 100 | 100 |
| HY 2954 [g] | 6 | 6 | 6 | 6 | 8 | 8 | 8 | 8 |
| isocyanate 2 [g] | 8.93 | 13.46 | 17.93 | 22.40 | 11.93 | 17.93 | 23.93 | 29.93 |
| Lap Shear Strength [N/mm$^2$] | | | | | | | | |
| 16 h/60° C. | 3.55 | 2.74 | 1.74 | 0.42 | 3.67 | 4.02 | 4.81 | 4.97 |
| 16 h/80° C. | 6.47 | 6.17 | 6.01 | 1.95 | 3.32 | 5.23 | 4.99 | 5.29 |

EXAMPLE 15

Comparison

A mixture of 100 g epoxy resin 1 and 5.87 g amine 3 is prepared and processed as described in Example 1. The resulting product is a clear viscous liquid. Lap shear samples made with this composition and cured at 60° C. and 80° C., respectively, do not produce results as the samples are still wet and tacky.

EXAMPLE 16

A mixture of 100 g epoxy resin 1, 5.87 g amine 3 and 18.6 g isocyanate 1 powder is prepared and processed as described in Example 2. The resulting product is a white viscous liquid.

Lap shear data of samples obtained from curing this composition are given in Table 3.

TABLE 3

| Curing Conditions | Lap Shear Strength [N/mm$^2$] |
|---|---|
| 4 h/60° C. | 0.037 |
| 16 h/60° C. | 0.728 |
| 1 h/80° C. | 1.64 |
| 2 h/80° C. | 1.57 |
| 3 h/80° C. | 2.90 |
| 4 h/80° C. | 3.32 |
| 16 h/80° C. | 4.41 |

The composition of Example 10 is cured at different temperatures for 30 min and the following lap shear values are obtained:

TABLE 4

| Curing Temperature | Lap Shear Strength [N/mm$^2$] |
|---|---|
| 60° C. | — |
| 80° C. | 1.10 |
| 100° C. | 2.28 |
| 120° C. | 2.67 |
| 140° C. | 2.85 |
| 160° C. | 2.93 |
| 180° C. | 3.39 |

EXAMPLE 17

Comparison

A mixture of 50 g epoxy resin 1, 50 g epoxy resin 2 and 6.73 9 amine 1 is prepared and processed as described in Example 1. The resulting product is a clear viscous liquid. No lap shear values can be measured with samples cured 16 h at 60° C. and 80° C., respectively do not produce results as the samples are still wet and tacky.

EXAMPLE 18

A mixture of 50 g epoxy resin 1, 50 g epoxy resin 2, 6.73 g amine 1 and 19.7 g isocyanate 1 powder is prepared and processed as described in Example 2. The resulting product is a white viscous liquid. Lap shear data of the cured products are summarized in Table 5.

TABLE 5

| Curing Conditions | Lap Shear Strength [N/mm$^2$] | Curing Conditions | Lap Shear Strength [N/mm$^2$] |
|---|---|---|---|
| 1 h/60° C. | 5.18 | 30 min/60° C. | 1.57 |
| 2 h/60° C. | 7.64 | 30 min/80° C. | 9.59 |
| 3 h/60° C. | 8.12 | 30 min/100° C. | 10.85 |
| 4 h/60° C. | 8.86 | 30 min/120° C. | 10.59 |
| 16 h/60° C. | 11.19 | 30 min/140° C. | 8.29 |
| 1 h/80° C. | 10.13 | 30 min/160° C. | 5.82 |
| 2 h/80° C. | 12.31 | 30 min/180° C. | 2.82 |
| 3 h/80° C. | 12.58 | | |
| 4 h/80° C. | 12.97 | | |
| 16 h/80° C. | 13.59 | | |

EXAMPLES 19–27

Blends of epoxy resin 1, amine 1, amine 2 and isocyanate 1 are prepared and processed as described in Example 2. The resulting products are solid; 19 is clear while 20–27 are white. The examples are cured at 60, and 80 and 120° C. for 1 h and the following lap shear data are obtained:

TABLE 6

| Example | 19 | 20 | 21 | 22 | 23 | 24 | 25 | 26 | 27 |
|---|---|---|---|---|---|---|---|---|---|
| epoxy resin 1 [g] | 100 | 100 | 100 | 100 | 100 | 100 | 100 | 100 | 100 |
| amine 1 [g] | 10.6 | 10.6 | 10.6 | 10.6 | 10.6 | 10.6 | 10.6 | 10.6 | 10.6 |
| amine 2 [g] | 6 | 6 | 6 | 6 | 6 | 6 | 6 | 6 | 6 |
| isocyanate 1 [g] | 0 | 5.2 | 10.4 | 15.6 | 20.8 | 25.4 | 31.2 | 41.6 | 52.0 |
| Lap Shear Strength [N/mm$^2$] | | | | | | | | | |
| 1 h/60° C. | 0.49 | 0.57 | 0.62 | — | 0.50 | — | 0.41 | 0.24 | 0.60 |
| 1 h/80° C. | 0.29 | 0.55 | 0.63 | — | 0.80 | — | 1.27 | 0.94 | 1.18 |
| 1 h/120° C. | 0.55 | 1.33 | 1.19 | — | 2.60 | — | 3.27 | 2.31 | 1.57 |

The invention claimed is:

1. A method for the manufacture of a one-component thermosetting resin composition in gel, paste or powder form which comprises mixing
    (A) an epoxide containing at least two epoxy groups per molecule,
    (B) an aliphatic or cycloaliphatic primary or secondary amine containing at least two amino-hydrogen atoms per molecule, and
    (C) a solid compound containing at least two isocyanate groups, and reacting the mixture at temperatures <50° C. until the viscosity of the mixture is at least 10% higher than the initial viscosity.

2. The method of claim 1 wherein component (A) is a diglycidyl ether or a diglycidyl ester.

3. The method of claim 1 wherein component (A) is a diglycidyl ether of bisphenol A or bisphenol F.

4. The method of claim 1 wherein component (B) is a cyclohexylamine, 4,4'diaminodicyclohexylmethane, 4,4'-diamino-3,3'-dimethyldicyclohexylmethane, 2,2-bis(4-aminocyclohexyl)propane or 2,2-bis(4-amino-3-methylcyclohexyl)propane.

5. The method of claim 1 wherein component C is a diisocyanate monomer, a diisocyanate dimer, a diisocyanate trimer or a solid reaction product of a diisocyanate and an aliphatic diol.

6. The method of claim 5 wherein the diisocyanate is selected from the group consisting of 2,4-toluene diisocyanate, 2,6-toluene diisocyanate, 2,3-toluene diisocyanate, 3,4-toluene diisocyanate, 4,4'-diphenylmethane diisocyanate, 2,2'-diphenylmethane diisocyanate, p-phenylene diisocyanate, isophorone diisocyanate and 4,4'-methylene-bis(cyclohexylisocyanate).

7. A crosslinked product obtained by curing the one-component thermosetting resin composition obtained by the process according to claim 1 at 60–180° C.

* * * * *